United States Patent [19]

Hamabata et al.

[11] 4,251,504

[45] Feb. 17, 1981

[54] PROCESS FOR PRODUCING ACICULAR GOETHITE

[75] Inventors: Toshihiro Hamabata; Shinji Umeki, both of Tokyo, Japan

[73] Assignee: TDK Electronics, Co. Ltd., Tokyo, Japan

[21] Appl. No.: 77,266

[22] Filed: Sep. 20, 1979

[51] Int. Cl.³ ............................................. C01G 49/02
[52] U.S. Cl. .................................. 423/632; 252/62.56; 423/633; 423/634
[58] Field of Search ...................... 423/632, 633, 634; 252/62.56

[56] References Cited

U.S. PATENT DOCUMENTS

| | | | |
|---|---|---|---|
| 2,558,304 | 6/1951 | Marcot et al. | 423/633 X |
| 4,060,596 | 11/1977 | Nakamura | 423/633 |
| 4,136,158 | 1/1979 | Okuda et al. | 423/633 X |

*Primary Examiner*—Jack Cooper
*Attorney, Agent, or Firm*—Oblon, Fisher, Spivak, McClelland & Maier

[57] ABSTRACT

An alkali hydroxide is added to an aqueous solution of ferrous salt to form a precipitate and a part of the solution is separated to control a ratio of an anion to a ferrous component to less than 1 and the ferrous component is oxidized to acicular goethite by bubbling air through the supernatant and precipitate.

6 Claims, No Drawings

PROCESS FOR PRODUCING ACICULAR GOETHITE

BACKGROUND OF THE INVENTION

1. Field of the Invention

The present invention relates to a process for producing an acicular goethite having fine particle size which can be used to produce magnetic particles having high coercive force.

2. Description of the Prior Arts

Heretofore, it has been known to produce the acicular goethite by adding an alkali ion to an aqueous solution of ferrous salt such as ferrous sulfate to give pH of higher than 11, and oxidizing it with air.

Thus, the conventional process has the disadvantages that it takes a long time for the production and the resulting acicular goethite has large particle size.

Recently, in the magnetic recording medium industry, it has been required to obtain a magnetic powder having high characteristics which can be used in high density. In order to satisfy such requirements, a magnetic powder having smaller particle size and higher coercive force has been required. However, it has been difficult to obtain such magnetic powder having small particle size and high coercive force by the conventional process.

SUMMARY OF THE INVENTION

It is an object of the present invention to provide a process for producing an acicular goethite having fine particle size which can be used to produce magnetic-particles having high coercive force.

The foregoing and other object of the present invention have been attained by providing a process for producing an acicular goethite which comprises adjusting pH of an aqueous solution of a ferrous salt to be higher than 11 and adjusting a ratio of an anion to the ferrous component to lower than 1 and oxidizing it at lower than 80° C.

DETAILED DESCRIPTION OF THE PREFERRED EMBODIMENTS

In the process of the present invention, the ferrous salt such as ferrous sulfate is used.

Various ferrous salts such as ferrous sulfate, ferrous chloride, ferrous nitrate, ferrous acetate, ferrous phosphate etc. can be used, though ferrous sulfate is preferable.

A concentration of the ferrous salt is usually in a range of 1 to 80 wt. %, preferably 3 to 50 wt. % especially 5 to 20 wt. %.

The ferrous salt is usually dissolved in water and if necessary, a desired modifier is added. An alkali metal hydroxide or carbonate is added to an aqueous solution of ferrous sulfate, nitrate, chloride, phosphate or acetate to precipitate ferrous hydroxide and the supernatant or filtrate is separated to control the ratio of the anion of the ferrous salt to the ferrous hydroxide to less than 1.

In accordance with the process of the present invention, an alkali metal compound especially an alkali hydroxide such as sodium hydroxide and potassium hydroxide is added to give pH of higher than 11. The ratio of an anion to the ferrous component is reduced to lower than 1 and the oxidation of the ferrous component is carried out with oxygen such as air at lower than 80° C. whereby an acicular goethite having fine particle size can be obtained.

It is preferable to give pH of higher than 13. In order to form $\alpha FeOOH$ in an alkaline side, it is necessary to give pH of higher than 11. When pH is in a range of 7 to 9, $Fe_3O_4$ is contaminated. It is preferable to give higher pH to obtain acicular $\alpha FeOOH$.

The oxidation can be carried out with oxygen containing gas such as air. The temperature in the oxidation is usually in a range of 30° to 55° C. When it is heated at higher than 60° C., $Fe_3O_4$ is contaminated.

The ratio of the anion to the ferrous component is lower than 1 and usually 0.1 to 0.5, preferably 0.15 to 0.3 especially about 0.17. When the ratio of the anion to the ferrous component is about 0.17, the acicular form is optimum and high coercive force can be obtained. The ratio can be controlled by separating a supernatant after adding an alkali to the solution of ferrous salt.

The oxidation with oxygen containing gas such as air is usually carried out by bubbling the oxygen containing gas through the alkaline ferrous salt aqueous solution having pH of higher than 11. The reaction time can be remarkably shortened so that fine acicular goethite can be obtained.

The acicular goethite obtained by the present invention has fine particle size and $\gamma$-$Fe_2O_3$ obtained from the acicular goethite has also fine particle size and it has superior magnetic characteristics to those of the conventional one.

The present invention will be further illustrated by certain examples and references which are provided for purpose of illustration only and are not intended to be limiting the present invention.

EXAMPLE 1

In 1.0 liter of water, 100 g, of a crystal of $FeSO_4 \cdot 7H_2O$ was dissolved and then 200 g. of NaOH was added and water was added to give 1.5 liter of the solution.

The solution was kept for 1 day to result a precipitation. The supernatant of the solution was decanted and water was added to give 1.5 liter. The ratio of the anion to the ferrous component was 0.17. The solution had pH of 13.6.

The solution was kept at 40° C. and air was bubbled to oxidize it. The reaction was completed for about 3 hours.

The precipitate resulted by the reaction had an acicular goethite. According to the observation of the product by an electron microscope, the product had particle sizes of about 0.5 to 0.7 $\mu$m. The product of the acicular goethite was treated by the conventional treatments of the heat-dehydration at 600° C.—the reduction at 400° C.—the oxidation at 350° C. The magnetic characteristics of the resulting $\gamma Fe_2O_3$ had Hc of 400 (Oe) and $\sigma s$ of 70 (emu/g.) and a specific surface area of about 45 $m^2/g$. measured by BET method.

EXAMPLE 2

In 1.0 liter of water, 100 g. of $FeSO_4 \cdot 7H_2O$ was dissolved and 200 g. of NaOH was added and water was added to give 1.5 liter of the solution.

The solution was kept for 1 day to result a precipitate. The supernatant (750 ml) was decanted and water was added to give 1.5 liter. The ratio of the anion to the ferrous component was 0.5. The solution was kept at 40° C., and air was bubbled to oxidize it. The reaction was completed for about 8 hours.

The resulting yellow precipitate had an acicular goethite structure. According to the observation of the product by an electron microscope, the product had particle sizes of about 0.5 to 0.9 μm. The product of the acicular goethite was treated by the conventional treatments of the heat-dehydration at 600° C.—the reduction at 400° C.—the oxidation at 350° C. The magnetic characteristics of the resulting $\gamma$-$Fe_2O_3$ had Hc of 390 (Oe), σs of 68 (emu/g.) and a specific surface area of about 40 m²/g. measured by BET method.

REFERENCE

In 1.0 liter of water, 100 g. of $FeSO_4 \cdot 7H_2O$ was dissolved and 200 g. of NaOH was added and water was added to give 1.5 liter of the solution. The ratio of the anion to the ferrous component was 1.0.

The solution was kept at 40° C. and air was bubbled to oxidize it. The reaction was completed for about 16 hours.

The resulting yellow precipitate had an acicular goethite structure.

According to the observation of the product by an electron microscope, the product had particle sizes of about 1.5 to 2.0 μm.

The product of the acicular goethite was treated by the conventional treatments of the heat-dehydration at 600° C—the reduction at 400° C.—the oxidation at 350° C. The magnetic characteristics of the resulting Δ-$Fe_2O_3$ had Hc of 380 (Oe), σs of 65 (emu/g.) and a specific surface area of about 20 m²/g. measured by BET method.

EXAMPLE 3

In 1.0 liter of water, 100 g, of $FeSO_4 \cdot 7H_2O$ was dissolved and 200 g. of NaOH was added and water was added to give 1.5 liter of the solution.

The solution was kept for 1 day to result a precipitate.

The supernatant (1.25 liter) was decanted and water was added to give 1.5 liter. The solution had pH of 13.6 and a ratio of the anion to the ferrous component was 0.17.

The solution was kept at 50° C. and air was bubbled to oxidize it. The reaction was completed for about 3 hours.

The precipitated resulted by the reaction had an acicular goethite of a αFeOOH. According to the observation of the product by an electron microscope, the product had particle sizes of about 0.7 to 0.9 μm. The product of the acicular goethite was treated by the conventional treatment of the heat-dehydration at 600° C.—the reduction at 400° C.—the oxidation at 350° C. The magnetic characteristics of the resulting $\gamma$-$Fe_2O_3$ had Hc of 450 (Oe) and σs of 72 (emu/g.) and a specific surface area of about 40 m²/g. measured by BET method.

EXAMPLE 4

In 1.0 liter of water, 100 g, of $FeSO_4 \cdot 7H_2O$ was dissolved and 200 g. of NaOH was added and water was added to give 1.5 liter of the solution.

The solution was kept for 1 day to result a precipitate. The supernatant (0.75 liter) was decanted and water was added to give 1.5 liter. The solution had pH of 13.6 and a ratio of the anion to the ferrous component was 0.5.

The solution was kept at 50° C. and air was bubbled to oxidize it. The reaction was completed for about 3 hours.

The precipitated resulted by the reaction had an acicular geothite of αFeOOH. According to the observation of the product by an electron microscope, the product had particle sizes of about 0.6 to 0.9 μm. The product of the acicular goethite was treated by the conventional treatment of the heat-dehydration at 600° C.—the reduction at 400° C.—the oxidation at 350° C. The magnetic characteristics of the resulting $\gamma$-$Fe_2O_3$ had Hc of 420 (Oe) and σs of 70 (emu/g.) and a specific surface area of about 41 m²/g. measured by BET method.

We claim:

1. A process for producing an acicular goethite comprising:
   adjusting the pH of an aqueous solution of a ferrous salt to a value higher than 11;
   allowing a precipitate of ferrous hydroxide to form;
   adjusting the ratio of the anion of the ferrous salt to the ferrous hydroxide to 0.1 to 0.5 by separating a portion of the supernatant from said precipitate; and
   oxidizing the precipitate by bubbling an oxygen-containing gas through the remaining supernatant and precipitate at a temperature lower than 80° C.

2. The process according to claim 1, wherein the pH of the aqueous solution of a ferrous salt is adjusted to a value higher than 11 by adding an alkali metal hydroxide or carbonate thereto.

3. The process according to claim 1, wherein the ferrous salt is selected from the group consisting of ferrous sulfate, ferrous nitrate, ferrous chloride, ferrous phosphate and ferrous acetate.

4. The process according to claim 1, wherein the ratio of the anion of the ferrous salt to the ferrous hydroxide is 0.15 to 0.3.

5. The process according to claim 4, wherein the ratio of the anion of the ferrous salt to the ferrous hydroxide is about 0.17.

6. The process according to claim 1, wherein the temperature of the oxidation is in the range of 30° to 55° C.

* * * * *